(12) United States Patent
Mays et al.

(10) Patent No.: US 9,523,583 B2
(45) Date of Patent: Dec. 20, 2016

(54) GENERATING ROUTES USING NAVIGATION MESHES

(71) Applicant: HERE Global B.V., Veldhoven (NL)

(72) Inventors: Joseph Paul Mays, St. Paul, OR (US); Robert Fernekes, McHenry, IL (US)

(73) Assignee: HERE Global B.V., Eindhoven (NL)

( * ) Notice: Subject to any disclaimer, the term of this patent is extended or adjusted under 35 U.S.C. 154(b) by 0 days.

(21) Appl. No.: 14/633,751

(22) Filed: Feb. 27, 2015

(65) Prior Publication Data

US 2016/0252355 A1 Sep. 1, 2016

(51) Int. Cl.
*G01C 21/20* (2006.01)

(52) U.S. Cl.
CPC ................. *G01C 21/206* (2013.01)

(58) Field of Classification Search
CPC .................................................. G01C 21/206
USPC .......................................................... 701/533
See application file for complete search history.

(56) References Cited

U.S. PATENT DOCUMENTS

| 8,824,337 | B1* | 9/2014 | Geisberger | G01C 21/3446 370/238 |
| 8,898,015 | B2* | 11/2014 | Tamai | G01C 21/3446 701/527 |
| 2006/0259597 | A1* | 11/2006 | Jiang | H04W 40/20 709/222 |
| 2007/0150121 | A1* | 6/2007 | Bitar | G01C 21/00 701/3 |
| 2007/0198178 | A1* | 8/2007 | Trimby | G06N 5/003 701/533 |
| 2007/0276709 | A1* | 11/2007 | Trimby | A63F 13/00 705/6 |
| 2008/0114542 | A1* | 5/2008 | Nambata | G08G 1/096827 701/533 |
| 2009/0125229 | A1* | 5/2009 | Peri | G01C 21/32 701/533 |
| 2010/0082248 | A1* | 4/2010 | Dorum | G01C 21/32 701/533 |
| 2010/0153005 | A1* | 6/2010 | Cerecke | G01C 21/3446 701/533 |

(Continued)

OTHER PUBLICATIONS

Agrawala, Maneesh, et al., "Rendering Effective Route Maps: Improving Usability Through Generalization," Stanford University, pp. 1-11, (May 13, 2001).
Botea, A., et al., "Near Optimal Hierarchical Path-Finding," J. Game Dev. 1(1), pp. 7-28, (2004).
Fischer, Leonardo, et al., "Semi-Automatic Navigation on 3D Triangle Meshes Using BVP Based Path-Planning," Institute of Informatics, UFRGS, pp. 33-40, Aug. 28-31, 2011.

(Continued)

*Primary Examiner* — Atul Trivedi
(74) *Attorney, Agent, or Firm* — Lempia Summerfield Katz LLC

(57) ABSTRACT

Systems, apparatuses, and methods are provided for developing an improved route from a navigation mesh. A route is provided, wherein the route includes a plurality of connected nodes having a starting node, an ending node, and internal nodes. Each internal node of the plurality of connected nodes is scored by an algorithm, wherein the score provided for each internal node based on an importance of the respective internal node to the overall shape of the route. The internal node with a score having a least importance on the shape of the route is removed, so long a valid path between the starting node and the ending node is maintained. The process may be repeated until a threshold simplification of the route has been achieved or until no further internal nodes can be removed without creating an invalid path.

17 Claims, 12 Drawing Sheets

(56) References Cited

U.S. PATENT DOCUMENTS

| | | | | |
|---|---|---|---|---|
| 2010/0195535 A1* | 8/2010 | Ziller | .................... | H04L 45/123 370/254 |
| 2010/0286909 A1* | 11/2010 | Tate, Jr. | ............. | G01C 21/3446 701/533 |
| 2011/0046927 A1* | 2/2011 | Jeong | ...................... | G06F 17/13 703/2 |
| 2011/0077854 A1* | 3/2011 | Fushiki | .............. | G01C 21/3469 701/533 |
| 2012/0158299 A1* | 6/2012 | Cerecke | ............ | G01C 21/3446 701/533 |
| 2012/0283948 A1* | 11/2012 | Demiryurek | ....... | G01C 21/3492 701/533 |
| 2014/0180584 A1* | 6/2014 | Carnevali | .............. | G01C 21/00 701/533 |
| 2014/0207376 A1* | 7/2014 | Nesbitt | .................. | H04L 45/00 701/527 |

OTHER PUBLICATIONS

Hong, Zeng, et al., "Automatic Navigation Algorithm in Virtual Complex Indoor Scenes," pp. 279-282, Nov. 4-5, 2011.

Jaklin, Norman, et al., "Stay Off the Lawn—Creating Smooth Paths Based on Region Preferences," Dept. of Information and Computing Sciences, Utrecht Univ. and Institute for Computational Engineering and Sciences, Univ. of Texas at Austin, pp. 1-8, (2013).

Johnson, G., "Smoothing a Navigation Mesh Path," AI Game Programming Wisdom 3, Charles River Media, pp. 129-139 (2006).

Latecki, L. J., et al., "Convexity Rule for Shape Decomposition Based on Discrete Contour Evolution," Computer Vision and Image Understanding, 73(3), pp. 441-454 (1999).

Pinter, M., "Toward More Realistic Pathfinding," Game Developer Magazine 8(4), 2001.

Thread: "Smooth Turning in Navigation Mesh?" A Blender Community, Feb. 26, 2015, http://blenderartists.org/forum/showthread.php?302916SmoothturninginNavigationMesh.

* cited by examiner

GENERATING ROUTES USING NAVIGATION MESHES

FIELD

The following disclosure relates to generating a smooth and valid route from a navigation mesh.

BACKGROUND

As the world population increases, more and more infrastructure, buildings, exterior and interior development, and other features to support human growth are being generated. Also, existing, infrastructure, buildings, parks, and other environments are being adapted to accommodate more people and traffic. The increase and adaptation of environments impacts travel and how people go from one place to another.

Navigation systems and/or devices are used to aid travel. For example, vehicle navigation devices may assist a person driving on a road network. Such devices may provide routing and guidance to a desired destination based on existing roads or pathways.

There are areas, however, in which people move about that do not have set roads, tracks, or paths or in which such paths are not needed to travel from one point to another within the area. For example, floors of a building, parks, or other exterior or interior areas are treaded upon on a daily basis. People are able to move about in such areas in any number of patterns to get from one place to another. Some movement or patterns of movement in these areas may be inefficient or unnecessary based on confusion, lack of knowledge of the layout of an area, or other factors. Also, a person may not know how to get from one point to a desired destination in such areas.

In certain examples, certain routes may be generated from a navigation mesh. Such routes directly generated from navigation meshes may not be smooth or may be more complex than necessary. Additionally, artifacts from the mesh layout may produce jagged or undesirable looking routes. These navigation mesh routes may also be difficult to provide turn-by-turn guidance, as it may not be apparent where the turns occur.

In certain embodiments, a technique referred to as a "string-pulling" algorithm or "pull-on-string" algorithm may be applied to simplify the route and make it more direct. This string-pulling algorithm includes a process of starting at one end of the route and checking whether intermediate points can be removed without violating the navigation mesh.

One problem with the string-pulling algorithm is that the algorithm does not respect the original shape of the route. In other words, it is a greedy algorithm that is only concerned with shortening the route. As such, the string-pulling algorithm may result in strange or unnatural looking routes that do not resemble the original route well.

SUMMARY

Systems, apparatuses, and methods are provided for generating an improved route from a navigation mesh. In one embodiment, the method comprises receiving a route, the route comprising a plurality of connected nodes having a starting node, an ending node, and internal nodes. The method further comprises scoring, using a processor, each internal node of the plurality of connected nodes, wherein a score is provided for each internal node based on an importance of the respective internal node to a shape of the route. The method further comprises removing an internal node with a score having a least importance on the shape of the route while maintaining a valid route between the starting node and the ending node such that the valid route does not cross into a non-navigable area. The method further comprises providing an updated route.

In another embodiment, the method comprises receiving a route generated from a navigation mesh, the route comprising a plurality of connected nodes having a starting node, an ending node, and internal nodes. The method further comprises scoring, using a processor, each internal node of the plurality of connected nodes, wherein a score is determined for each internal node based on an importance of the respective internal node to a shape of the route, the score being based upon (1) an incoming segment length from a first adjacent node to the respective internal node and an outgoing segment length from the respective internal node to a second, opposite adjacent node, and (2) a path angle created between the first adjacent node, the respective internal node, and the second, opposite adjacent node. The method further comprises removing an internal node with a score having a least importance on the shape of the route while maintaining a valid route between the starting node and the ending node such that the valid route does not cross into a non-navigable area. The method further comprises repeating the scoring and the removing of the internal nodes, while maintaining the valid route, until no further internal nodes can be removed. The method further comprises providing an updated route without the removed internal nodes.

In yet another embodiment, the apparatus comprises at least one processor and at least one memory including computer program code for one or more programs; the at least one memory and the computer program code configured to, with the at least one processor, cause the apparatus to at least perform: (1) receive a route comprising a plurality of connected nodes having a starting node, an ending node, and internal nodes; (2) score each internal node of the plurality of connected nodes, wherein a score is provided for each internal node based on an importance of the respective internal node to a shape of the route; (3) remove an internal node with a score having a least importance on the shape of the route while maintaining a valid route between the starting node and the ending node such that the valid route does not cross into a non-navigable area; and (4) provide an updated route.

BRIEF DESCRIPTION OF THE DRAWINGS

Exemplary embodiments are described herein with reference to the following drawings.

DETAILED DESCRIPTION

The following embodiments include systems, methods, and apparatuses for improving and simplifying a path route. In certain embodiments, a route is generated with a routing algorithm. The route may be a shortest-path route. The route may be generated using a mesh-based graph (e.g., a navigation mesh or "navmesh"). A navigation mesh may refer to a data structure used to model traversable areas of a virtual map such as a video game or an indoor location.

The generated route may be sent to a processor for further analysis or post-processing of the route with an algorithm, therein providing an improved, simplified route. The algorithm may be a curve evolution based path simplification algorithm. In such an algorithm, various nodes of the route are weighted or scored based on their respective value to the overall route. Nodes having low importance may be removed from the shortest-path route so long as the updated route remains valid. For example, removing a node from a route cannot create a route that passes through a non-traversable location such as a wall. In some embodiments, post-processing may be completed when a predefined threshold for simplification of the route is achieved. In other words, the post-processing may be completed when a threshold or maximum number of nodes remain present in the route, or when the overall route is below a threshold data level (allowing for easier transmission of the simplified route data over a connected network). In other embodiments, the post-processing may be completed when no remaining nodes meet a minimum score (wherein the minimum score could be based in part on the navigation mesh resolution, e.g., an average area of the node in the mesh). In other embodiments, the post-processing is completed when no more nodes may be removed without creating an invalid route.

The updated, post-processed route may be provided to an end-user or map developer for implementation. For example, post-processing of route, as described herein, may be used in the map routing industry (e.g., for an improved indoor mapping route). Post-processing may also be used in the video game industry or the robotics industry.

Post-processing, as described herein, may provide a smoother and/or more simplified route when compared with the provided route. The undesirable or jagged looking segments of the route may be cleaned up. Additionally, turn-by-turn guidance may also be simplified with the post-processing.

Further, in comparison with a string-pulling algorithm, post-processing using a curve evolution based algorithm may provide a smoother and more simplified route while still respecting the original shape of the route. In other words, the curve evolution based algorithm may provide a more natural looking route over a string-pulling algorithm.

In the following discussion, example environments are described that may employ the post-processing techniques described herein.

Generating and Providing a Navigation Mesh Route for Post-Processing

Figure 1:
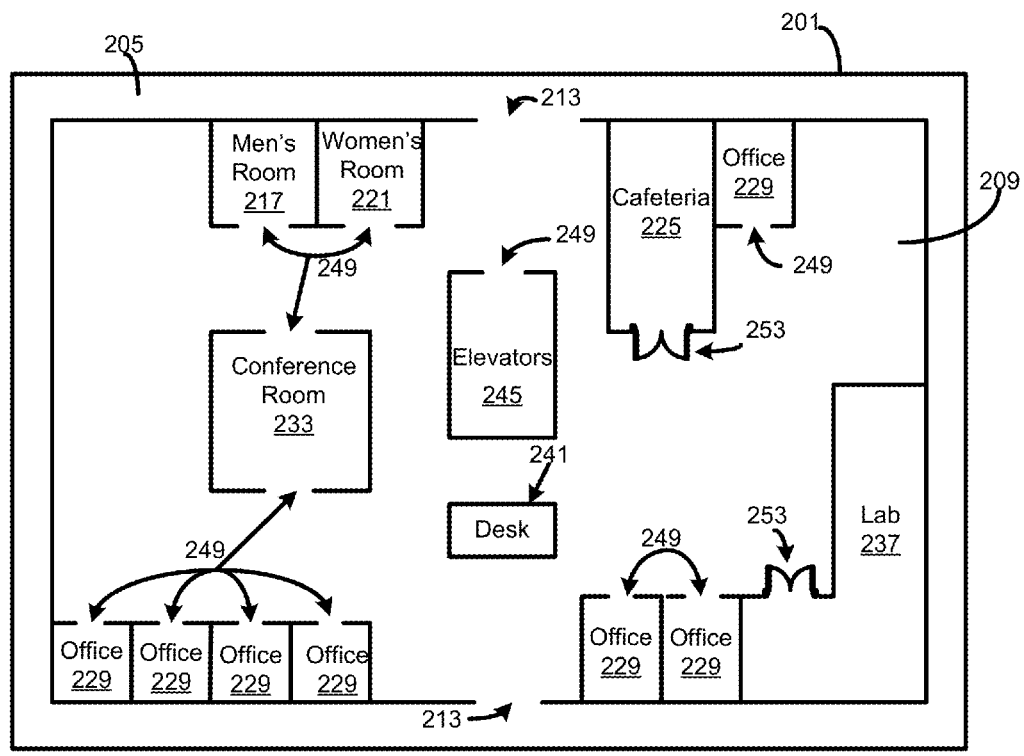
FIG. 1 depicts an example of a layout used for generating and processing a navigation mesh.

In certain embodiments, a route may be provided to a processor for post-processing of the route. The route provided to the processor may be generated from a navigation mesh or an open area map. For example, FIG. 1 is an embodiment of an image 201 of a layout used to generate a route. The image 201 may be a pre-existing or publicly available image (e.g., is associated with the image source 104 or other source) that can be downloaded from the Internet or other network. For example, the image 201 may be downloaded, received, obtained from a website or other source. The image 201 may represent a real-world layout or floor plan of a building floor, such as a first floor or other floor, or a virtual-world layout used within a video game. The image 201 includes graphical representations or icons of areas, spaces, and/or designations in the layout. For example, the image 201 includes image reference objects, such as a men's room 217, a women's room 221, a cafeteria 225, offices 229, a conference room 233, a lab 237, a desk 241, and elevators or elevator bank 245. Image representations of doors 249 are also provided. The doors 249 are shown as a gap or opening in respective image reference objects. Alternatively, a door may be represented using a door symbol or image object 253 rather than an opening. Or, there may not be a representation of a door or opening.

The image 201 also includes an image representation of an open space, a walking grounds, a common or public area, and/or a hall area 209 for people to walk or move about to get from one place to another on the floor. Walls or barriers are depicted by corresponding, associated, or contiguous pixels or lines (e.g., a heavy line) of substantially the same or similar color. Entrances and/or exits 213 are depicted as openings or gaps in the walls or barriers that allow access between the interior area 209 and an exterior area 205. The exterior area 205 may represent an outer hallway, an outside of the building (e.g., a sidewalk, street, or road), or other exterior environment.

Figure 2:
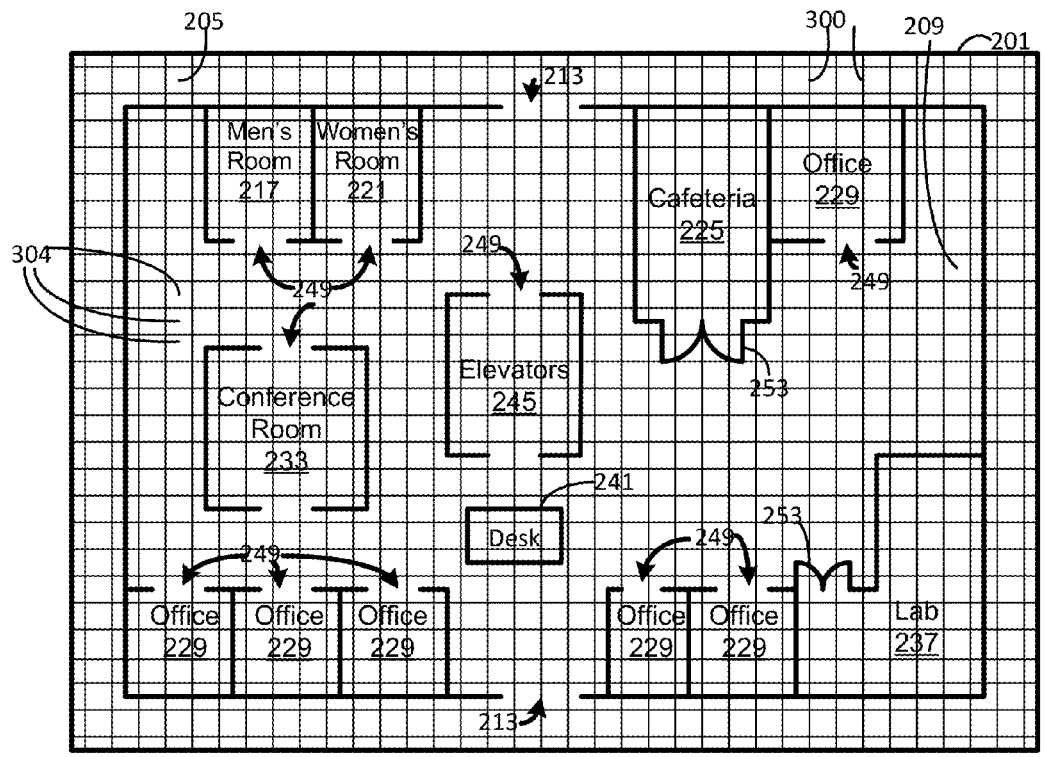
FIG. 2 depicts an example of a grid, mesh, or array applied over the layout of FIG. 1.

FIG. 2 is an embodiment of the image 201 corresponding to or undergoing a process of FIG. 1. For example, the image 201 is downloaded or received at a device or processor for generation of a route. The image 201 may be used to create or generate the open area map that is routable. For example, a grid, mesh (e.g. navigation mesh), or array 300 is applied on or over the image 201 or a copy of the image 201. The grid, mesh, or array 300 may be a grid or array of geometric shapes (e.g., uniform sized geometric shapes), such as tiles, nodes, sections, blocks, points, dots, circles, polygons, or other shapes. The grid or mesh (e.g., navigation mesh) 300 may cover an entire ground area of the image 201. A ground area refers to a surface, plane, or floor or a portion thereof that can be walked upon as well as the surface in which objects or barriers may be placed or positioned on or over.

The grid or mesh 300 may include areas, sections, blocks, tiles, or nodes 304. Alternatively, the grid, mesh, or array 300 may include unconnected dots or points corresponding to areas or sections similar to the nodes 304. The nodes 304 may have a substantially rectangular or square shape and are substantially uniform in size. Alternatively, the tiles or nodes 304 may have a circular, triangular, or other geometric or polygon shape, and the tiles or nodes 304 may be different sizes at different locations rather than being uniform.

The grid 300 may be applied over certain areas of the layout rather than the entire image or entire ground area. For example, the grid 300 may be applied only in hallway areas, such as the interior area 209. In such a case, the grid 300 may have a shape that corresponds to an accessible contiguous sub-area within the real-world or virtual-world area in which the shape has a boundary that corresponds to the walls in the pre-existing image. The grid 300 or portions thereof may also be applied to areas designated within an image reference object (e.g., the inner area of a room). Also, tiles may automatically fill into contiguous open areas. For example, a hallway or corridor area may be selected to automatically fill the area with tiles or sections of a grid or mesh.

The tiles or nodes 304 may be assigned or designated coordinates, such as local or global map coordinates. For example, each center of a tile 304 or other part of the tile is given a (x, y), latitude and longitude, or other coordinate designation. One of the tiles 304, such as at a corner of the image, may be designated as an origin point (0,0) for reference and positioning purposes. The coordinates allows items, features, or regions to be searchable. In certain embodiments, the coordinates are not used for routing purposes.

Figure 3:
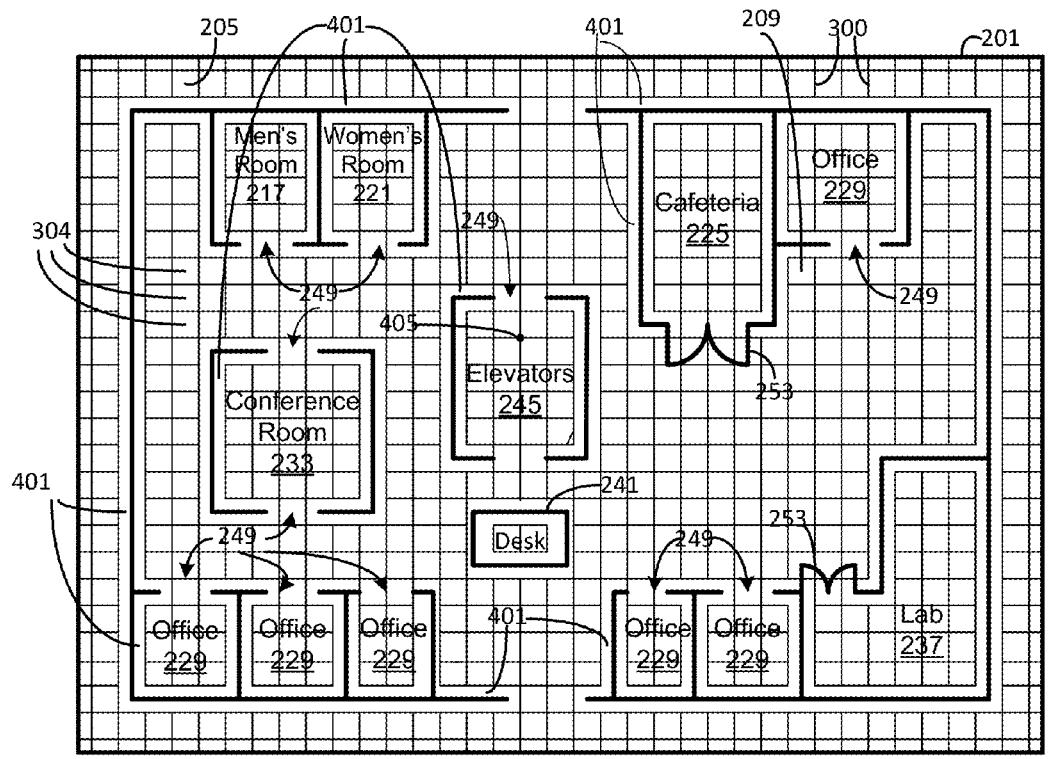
FIG. 3 depicts an additional example of a grid, mesh, or array applied over the layout of FIG. 1 with identified non-navigable areas.

FIG. 3 is an embodiment of the image 201 corresponding to or undergoing another step or process after the mesh 300 (e.g., navigation mesh) has been overlaid. Tiles that are not to be walked on or that are non-navigable are provided as tiles or area 401 (e.g., the tiles or area 401 may be replaced with unconnected dots or points that represent non-navigable areas). For example, tiles surrounding or under or associated with borders or walls of the image reference objects (e.g., reference objects 217, 221, 225, 229, 233, 237, 241, and 245) are selected to be or are designated as non-navigable tiles or areas 401. Also, the image representation of the border, barrier or wall between the interior hall area 209 and the exterior area 205 is associated with the non-navigable tiles 401 for routing purposes. The tiles 401 allow routes to be prohibited from passing through walls or barriers to represent a real-world or virtual-world experience. However, doors 249 and 253 are associated with navigable tiles 304 to allow routing in and out of rooms or areas surrounded by tiles 401. Alternatively, if no doors or openings are present or created, tiles substantially adjacent or proximate to reference areas may be used for routing to and from respective reference areas.

The non-navigable tiles 401 may be or represent tiles (or nodes, dots, or points) removed from the grid 300 or may be tiles (or nodes, dots, or points) designated with a non-navigable status. The non-navigable tiles 401 or the lack thereof may be represented as blank spaces, in which spaces that are free of the grid or tiles are not navigable for routing purposes. Alternatively, the non-navigable tiles 401 may be colored differently than the navigable tiles 304.

Navigable or non-navigable tiles, nodes, or points may be sub-classified. For example, each or some tiles may be associated with a feature or location related to the layout. In one embodiment, tiles may be linked or correspond to a washroom area, a narrow area, a windowed area, a dimly lit area, a high traffic area, a low traffic area, or other area or feature. By classifying or sub-classifying the tiles, one can input preferences for routing purposes. For example, a user may want to avoid high traffic areas, and, accordingly, the user may input his or her preference before or during routing.

A wrap or boundary feature may be used with the grid 300. In certain cases, a person may want to route from one point in the interior area 209 to another point in the interior area 209, but a path is generated that routes the person out into the exterior area 205 and back into the area 209. Such routes may occur when it is optimum to route outside and back inside (e.g., when having multiple openings between interior and exterior areas). However, to avoid any routing to tiles or locations in the exterior area 205, a wrap or boundary feature may be used that bounds all routing within the area 209 and associated areas. For example, a boundary line or designation may be allocated along the circumference of the inner area. However, the boundary feature will allow routing to the exterior area 205 when a user selects a destination point to be in the exterior area 205 or outside an inner area. Alternatively, the tiles of the exterior area 205 may be designated as non-navigable, or openings to the exterior area 205 may be associated with non-navigable tiles 401.

A connection point 405 may also be provided. The connection point 405 may be generated or provided in a spatial or data layer separate from the grid or mesh 300. The connection point 405 is represented as a tile 304 or a subset of tiles 304 within an area. The connection point 405 may encompass the entire area of the elevators 245 or a portion thereof. Alternatively, the connection point 405 may not be associated with a reference image object or reference region. The connection point 405 represents or acts as a link to another map, such an open area map that is routable, for routing and navigation purposes. For example, the connection point 405 may correspond to one or more elevators, a stairwell, an escalator, a ladder, or other feature for moving a person to another floor or area. A plurality of connection points 405 may correspond to respective individual elevators or features. In one embodiment, the connection point 405 is used to route between an area or point from the image 201 to another point or area on another map or floor plan, such as another map or floor plan representing another floor of the building (e.g., a second floor, a third floor, or Nth floor). Alternatively, the connection point 405 may represent a connection for moving or transferring a person from one point to another point on the same floor or ground area. For example, the connection point 405 may correspond to a moving walkway or other transportation device. Also, the connection point 405 may represent a connection to another routable open area map associated with the same level or area. For example, in one open area map, a route may be generated to an area that is represented by a blank, unspecific, or general polygon or shape that represents a reference area, such as a food court. A connection point can be placed at, by, or on the general polygon that represents the reference area in which the connection point corresponds to or directs one to another routable open area map that has detailed features and/or reference regions within the original reference area (e.g., the food court).

In certain embodiments, a route is determined between a selected origin point or node to a destination point or node within the grid 300. The route is determined based on a comparison of various alternative routes based on the underlying compiled grid.

The calculation and determination of the possible routes or paths are based on or formed by connecting adjacent tiles or nodes together between the starting node and destination node. For example, navigable tiles or nodes that border or touch each other are considered for point-to-point routing, in which any area in the layout or any point associated with adjacent nodes can be routed based on a calculation regarding the grid or mesh (i.e., not solely pre-determined routes). Adjacent nodes forming a route may be connected or linked by their center points or other parts.

Possible routes may be calculated based on a Dijkstra method, an A-star algorithm or search, and/or other route exploration or calculation algorithms that may be modified to take into consideration assigned cost values of the underlying tiles. Various other aspects, such as distance, non-navigable areas, and/or restrictions, may be considered in addition to the cost to determine an optimum route.

A route is then selected as the best route of the possible routes calculated. The route comprises the starting tile or node, the destination or ending tile or node, the connecting internal tiles or nodes between the starting and ending nodes. The selected route may be a shortest-path route.

Post-Processing of the Route

In an effort to enhance or simplify this determined route, the route is provided to and received by a device or processor for post-processing with an algorithm.

In the post-processing algorithm, non-essential internal nodes between the starting node and ending node may be removed, therein providing the improved, simplified route or open area map. The process of removing non-essential internal connection points or nodes may be based on a curve evolution algorithm, wherein a scoring value is assigned to each node in which the scoring value for each node provides a ranking of the node's importance to the shape of the route.

In certain embodiments, the scoring value assigned to each selected node along the route may be based on one or more factors. For example, one factor may be the length of the route segment connecting the adjacent node closer to the starting node to the selected node (i.e., the inbound segment length). In some embodiments, a higher value or importance may be designated to a longer segment length in comparison to a shorter segment length (i.e., a segment having a greater distance in comparison to a segment having a shorter distance between nodes).

Another factor may be the length of the route segment connecting the selected node to the adjacent node in the direction of the ending node (i.e., the outbound segment length). Similar to the inbound segment length, a higher value or importance may be assigned to a longer outbound segment length between adjacent nodes.

In some embodiments, a factor in defining the scoring value of the selected node may be the path angle created between the inbound segment and outbound segment (i.e., the path angle created between a first adjacent node, the selected node, and the second adjacent node). For example, a higher value or importance may be assigned to selected nodes having a smaller angle (e.g., an acute angle less than 90°) between the first adjacent node, the selected node, and the second adjacent node in comparison to an obtuse angle greater than 90° created between the first adjacent node, the selected node, and the second adjacent node.

In other embodiments, a factor in defining the scoring value of each node may be how close the node is to a border or non-traversable object (e.g., a wall). For example, a low importance or value may be designated to a node associated with and/or substantially adjacent to a borders or non-traversable object, and a higher importance or value may be designated to a node that is farther away from the borders or non-traversable object.

In yet other embodiments, a factor in defining the scoring value of each node may be the resolution of the navigation mesh. For example, the inbound or outbound length segments could be limited or capped at a certain length based on the resolution of the navigation mesh.

Any number or integer may be used in starting the progression of scoring values assigned to the tiles or nodes. Alternatively, letters, colors, or any other designation may be used to assign the value to the respective nodes. For example, different colors may be associated with different values for editing and/or display purposes.

In certain embodiments, an overall scoring value assigned to each node along the route is calculated by combining scoring values for each individual factor (such as the incoming segment length, outbound segment length, created path angle at the node, etc.). For example, an overall node value may be calculated based on the equation below:

$$\text{Overall Node Value} = w1*f1 + w2*f2 + \ldots + wN*fN$$

wherein $w1 + w2 + \ldots + wN = 1$.

In the equation above, $f1, f2, \ldots, fN$ define the scoring values for each individual factor, and $w1, w2, \ldots, wN$ define the individual weights for each individual factor. In certain embodiments, the individual weights are equal. In other embodiments, one or more factors are prioritized (i.e., given a higher weight) over one or more additional factors. For example, the weighting process may be adjusted to favor certain factors over others based on the size and/or shape of the route or navigation mesh. In other words, the individual weights for each factor may be tweaked to generate a simplified route that is improved over the non-post-processed route or a route post-processed using a string-pulling algorithm.

As calculated, higher overall node values may refer to nodes that are more important to the path route than nodes with lower overall node values.

Following the calculation of each node value along the route, the internal node with the lowest score value may be removed from the path route, so long as removal of the node does not create an updated path route that is invalid. For example, a node may not be removed to create an updated route that travels through a non-traversable area (e.g., the updated route cannot travel through a wall). As such, if the node with the lowest score value may not be removed, the internal node with the next lowest score value is removed, wherein the node is also subjected to the same validation requirement (i.e., the updated route must still be a valid route).

Following the removal of an internal node and creation of an updated route, the route evaluation process may be repeated. In the iterative process, the remaining nodes are scored again, and the lowest scored node is removed so long as the updated route without the node remains valid. In some embodiments, the scoring and removal process is repeated until no further internal nodes remain.

Figure 4A:
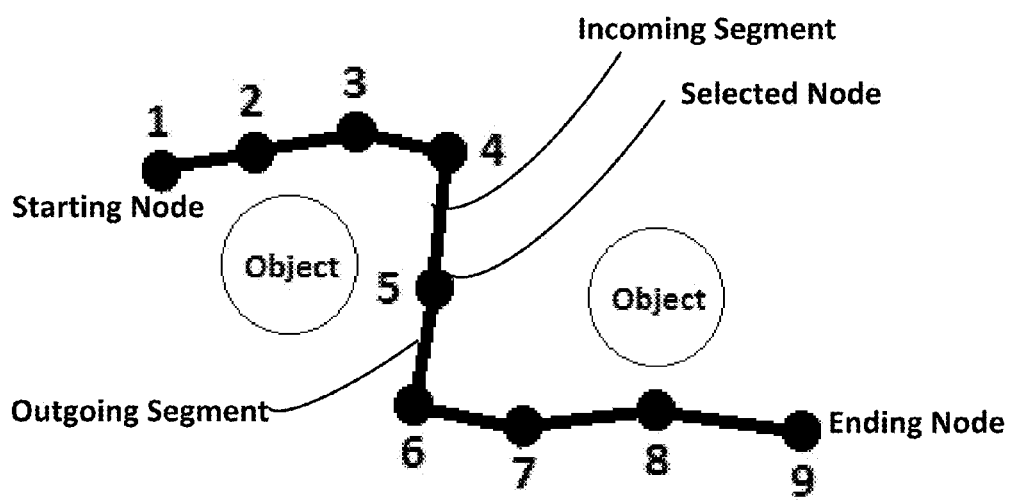
FIG. 4A depicts an example of a route with no post-processing.
Figure 4B:
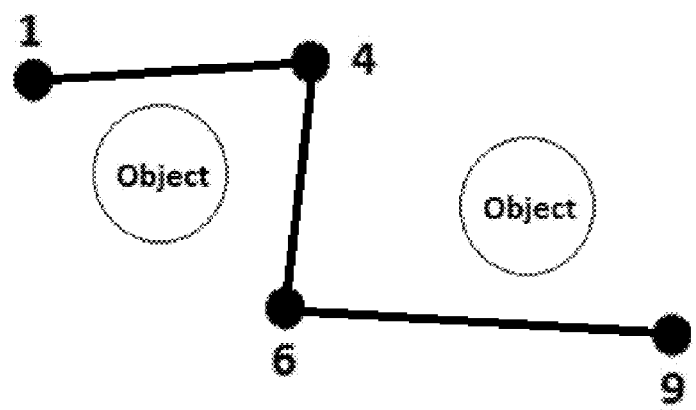
FIG. 4B depicts an example of post-processing the route of FIG. 4A to provide a simplified route or open area map.

A non-limiting example of a simplification of a route is depicted in FIGS. 4a and 4b. In FIG. 4A, a route is provided between a starting node 1, internal nodes 2-8, and an ending node 9. The route undergoes a post-processing analysis, wherein the value of each node is analyzed. Internal nodes are subsequently eliminated so long as elimination of each node does not affect the validity of the route. For example, nodes 2, 3, and 4 cannot all be eliminated—as a route directly between nodes 1 and 5 would cross a non-traversable area (i.e., the object blocking the path). As depicted in FIG. 4A, analysis of each node may include an evaluation of the incoming segment length to a selected node (e.g., if node 5 is the selected node for analysis, the segment between nodes 4 and 5 represents the incoming segment). The outgoing segment length may also be analyzed (e.g., if node 5 is the selected node, the segment between nodes 5 and 6 represents the outgoing segment). Path angles created between the incoming segment and outgoing segment may also be analyzed.

The analysis and elimination of internal nodes to simplify the route may be completed when no further nodes may be removed from the route without creating an invalid route. In other embodiments, the post-processing analysis and elimination of nodes may be completed when a threshold or maximum number of nodes remain present in the route, or when the overall route is below a threshold data level. In other embodiments, the post-processing may be completed when no remaining nodes meet a minimum score (wherein the minimum score could be based in part on the navigation mesh resolution, e.g., an average area of the node in the mesh).

FIG. 4B depicts a non-limiting example of a simplified route that has completed the post-processing analysis. As depicted, internal nodes 2, 3, 5, 7, and 8 have been eliminated, leaving only internal nodes 4 and 6. The route cannot be simplified any further, as elimination of either or both internal nodes would create an invalid route crossing through one of the depicted objects (e.g., a wall or other non-traversable area).

Figure 5A:
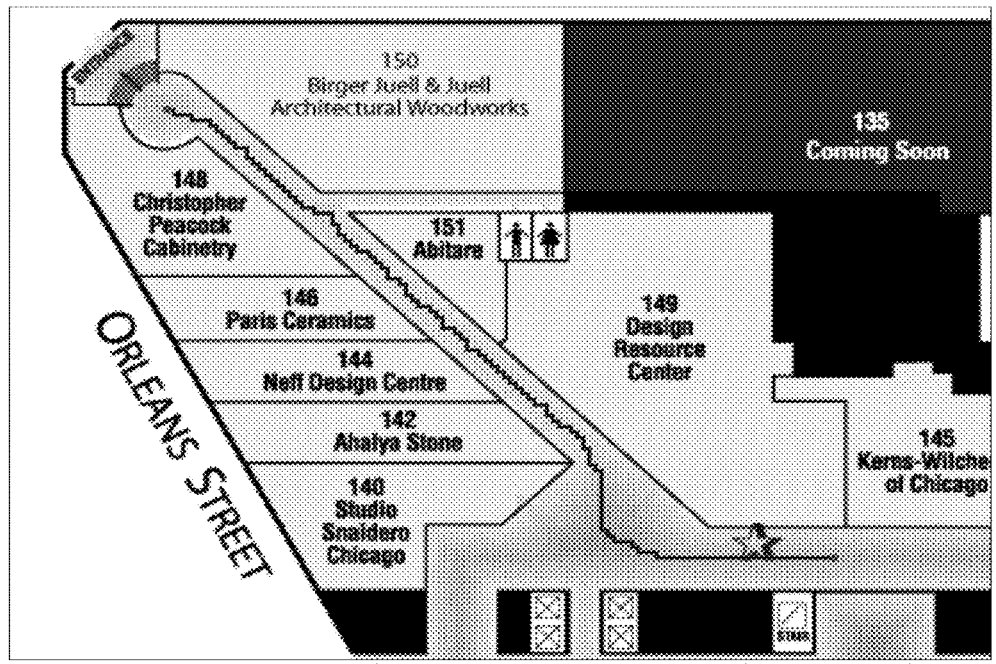
FIG. 5A depicts an example of a route using a navigation mesh with no post-processing.

FIGS. 5A-C, 6A-C, and 7A-C depict three additional examples of post-processing a route. For example, FIG. 5A depicts a route that has not undergone any post-processing. As depicted, the route begins at a starting node, passes through each intermediate node, and concludes at an ending node. The route includes jagged or undesirable looking segments and is more complex than necessary to depict a path between starting and ending nodes.

Figure 5B:
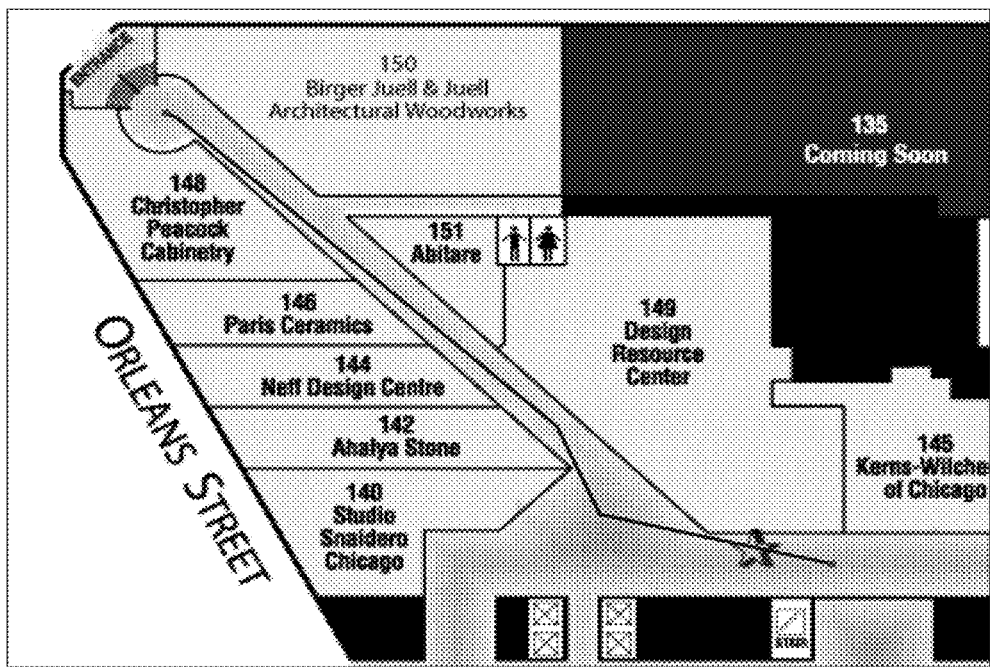
FIG. 5B depicts an example of processing the route of FIG. 5A using a string-pulling algorithm.

FIG. 5B depicts one example of post-processing the route of FIG. 5A, wherein a string-pulling algorithm is used to simplify the route and make it more direct. The string-pulling algorithm includes a process of starting at one end of the route and checking whether intermediate points can be removed without violating the navigation mesh. As mentioned above, one problem with the string-pulling algorithm is that the algorithm does not respect the original shape of the route. In other words, it is a greedy algorithm that is only concerned with shortening the route. As such, the string-pulling algorithm may result in strange or unnatural looking routes that do not resemble the original route well. For example, as shown in FIG. 5B, the simplified route using a string-pulling algorithm provides a route that travels very close to a wall at three separate locations. Therefore, while the route may provide improvements in its turn-by-turn directions between the starting and ending nodes over the unprocessed route, the modified route does not necessarily provide an optimal path traveling through certain nodes in the center of the traversable pathway.

Figure 5C:
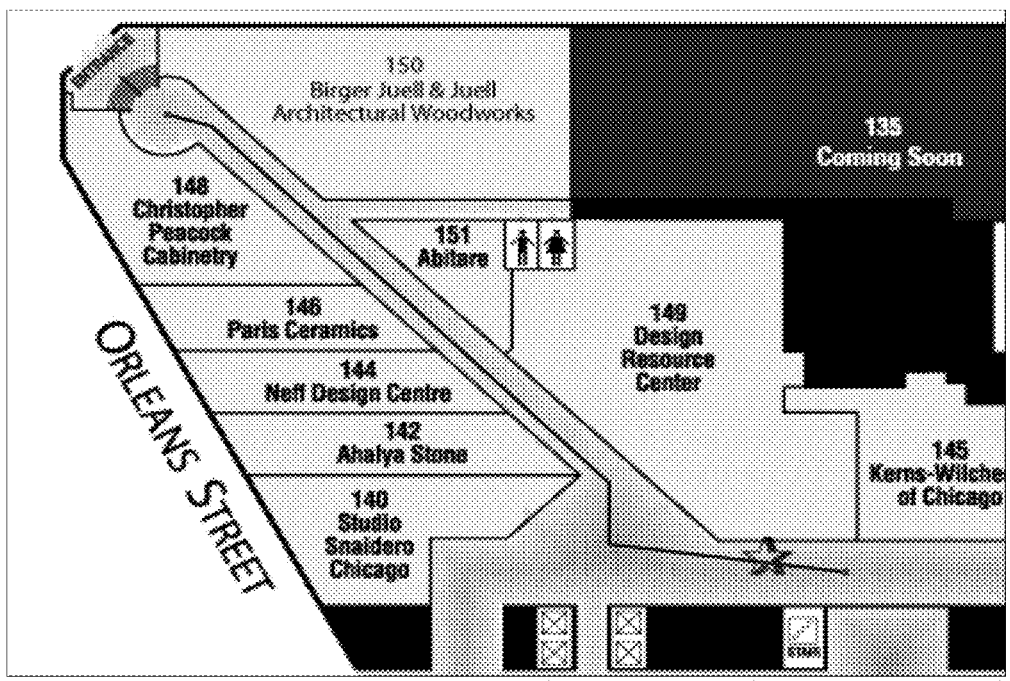
FIG. 5C depicts an example of post-processing the route of FIG. 5A using an algorithm described herein to provide a simplified route or open area map.

FIG. 5C depicts an example of post-processing the route of FIG. 5A using a curve evolution algorithm as described herein. The curve evolution algorithm, as described above, may analyze each internal node to determine which node provides the least value to the route. This analysis may take into account various factors for a selected node such as the incoming segment length, the outgoing segment length, the path angle created by the incoming and outgoing segments, or the proximity of the path or node to a non-traversable area (e.g., a wall). As depicted in FIG. 5C, the updated path has eliminated all but three internal nodes between the starting and ending node. Also, the updated path does not travel as close to a non-traversable area as the route in FIG. 5B created by a string-pulling algorithm.

Figure 6A:
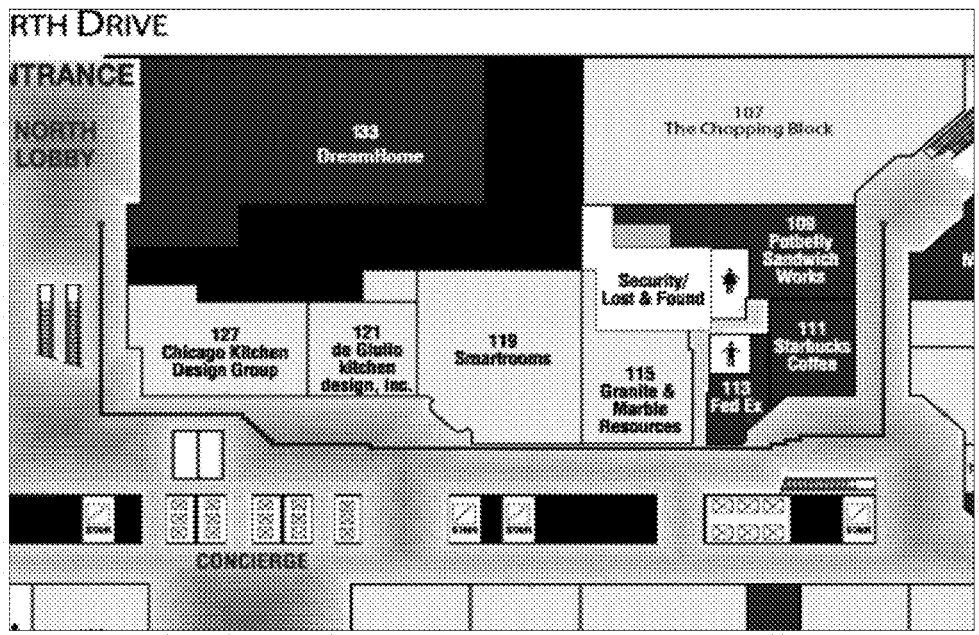
FIG. 6A depicts an additional example of a route using a navigation mesh with no post-processing.

In another non-limiting example, FIG. 6A depicts a route that has not undergone any post-processing. As depicted, the route begins at a starting node, passes through each intermediate node, and concludes at an ending node. The route includes jagged or undesirable looking segments and is more complex than necessary to depict a path between starting and ending nodes.

Figure 6B:
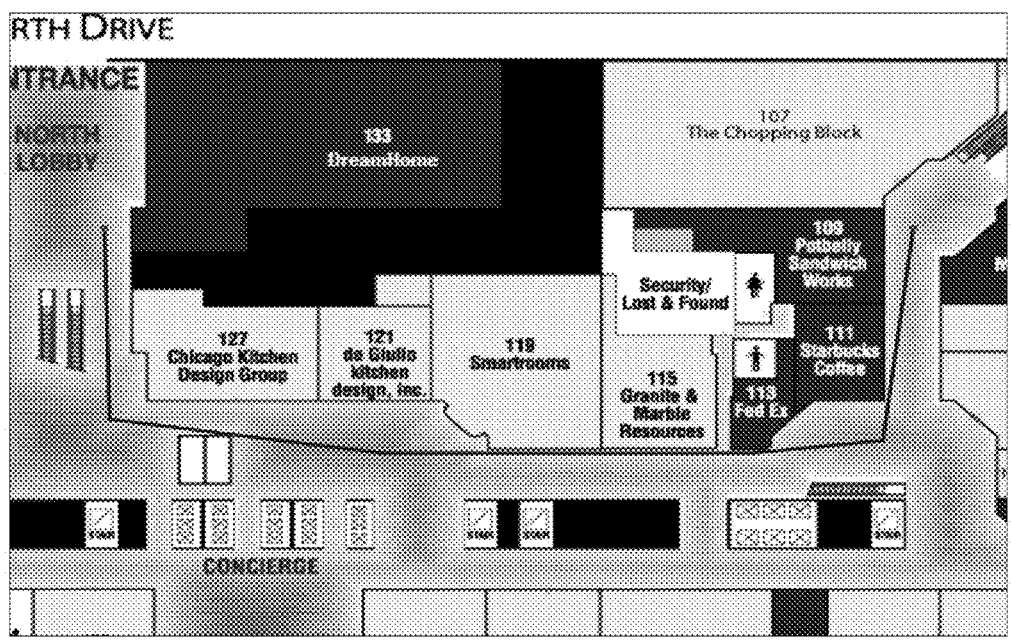
FIG. 6B depicts an example of processing the route of FIG. 6A using a string-pulling algorithm.

FIG. 6B depicts an example of post-processing the route of FIG. 6A using a string-pulling algorithm. While providing one version of a simplified route, using a string-pulling algorithm may not necessarily provide an optimal path traveling through certain nodes in the center of the traversable pathway.

Figure 6C:
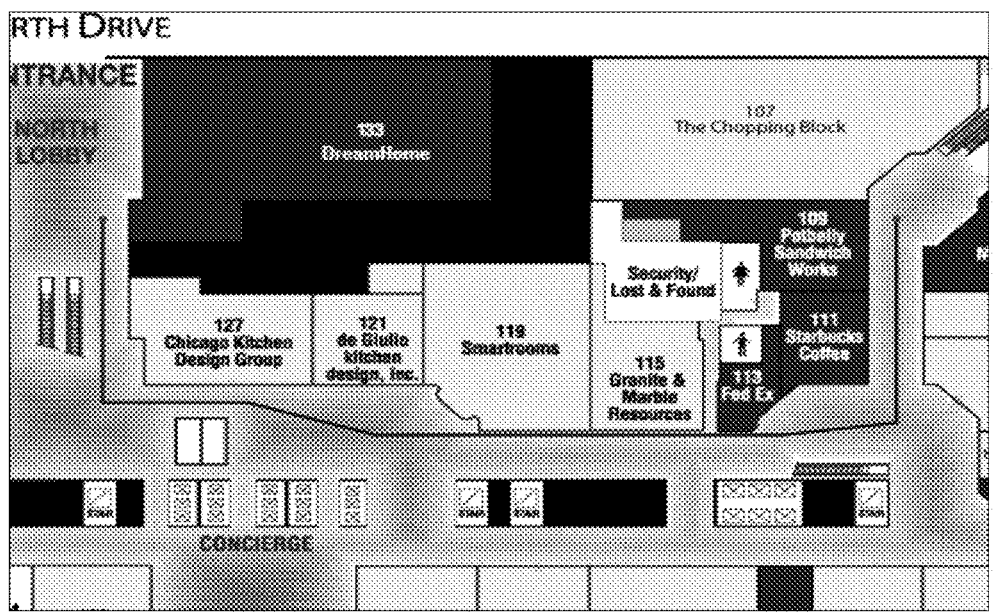
FIG. 6C depicts an example of post-processing the route of FIG. 6A using an algorithm described herein to provide a simplified route or open area map.

FIG. 6C depicts an example of post-processing the route of FIG. 6A using a curve evolution algorithm. As depicted in FIG. 6C, the updated path has eliminated all but five internal nodes between the starting and ending node. Also, the updated path does not travel as close to various non-traversable areas as the route in FIG. 6B created by a string-pulling algorithm.

Figure 7A:
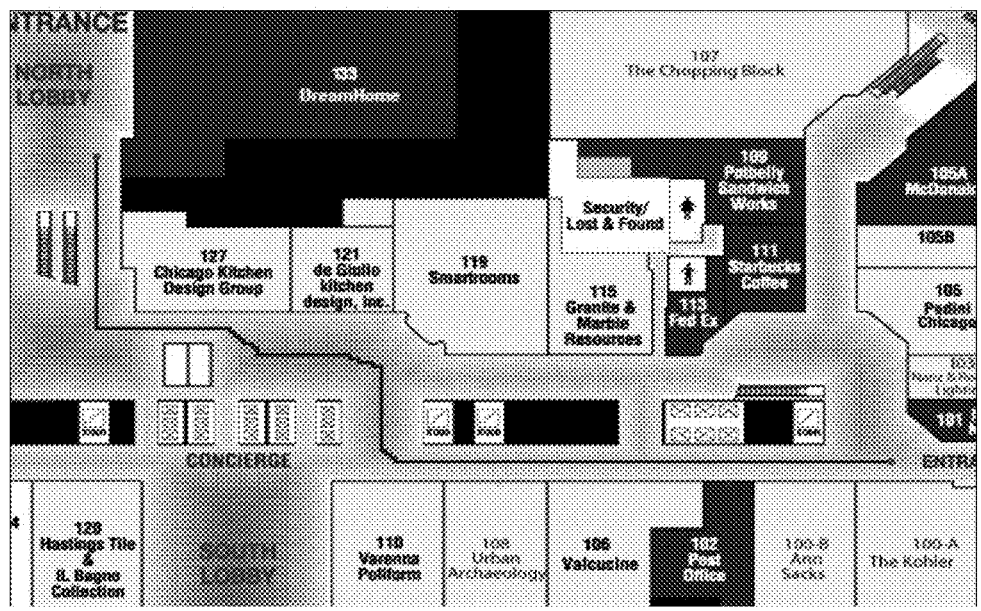
FIG. 7A depicts an additional example of a route using a navigation mesh with no post-processing.

In yet another non-limiting example, FIG. 7A depicts another route that has not undergone any post-processing. As depicted, the route begins at a starting node, passes through each intermediate node, and concludes at an ending node. The route includes jagged or undesirable looking segments and is more complex than necessary to depict a path between starting and ending nodes.

Figure 7B:
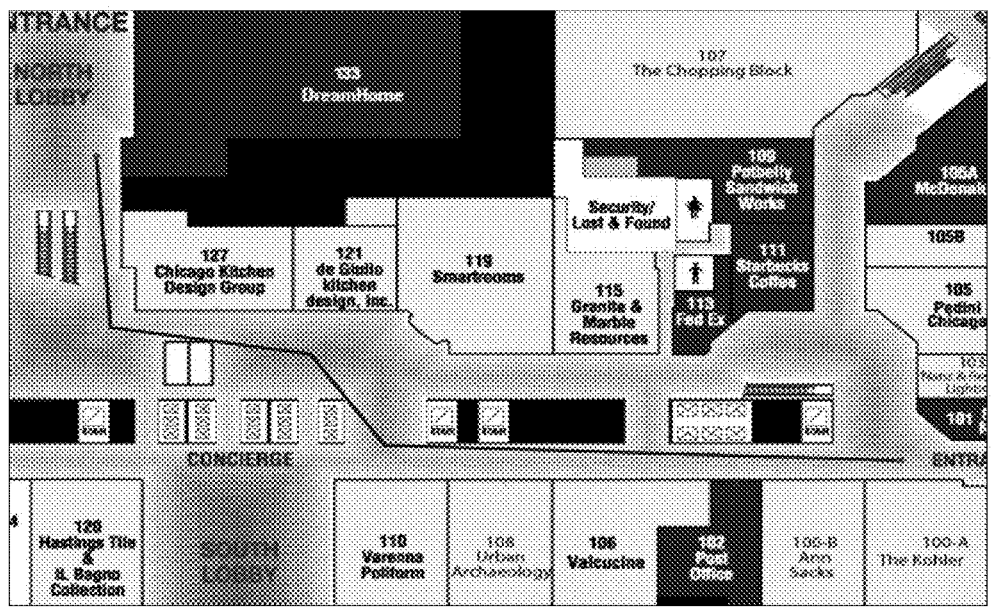
FIG. 7B depicts an example of processing the route of FIG. 7A using a string-pulling algorithm.

FIG. 7B depicts an example of post-processing the route of FIG. 7A using a string-pulling algorithm. While providing one version of a simplified route, the string-pulling algorithm may not necessarily provide an optimal path traveling through certain nodes in the center of the traversable pathway.

Figure 7C:
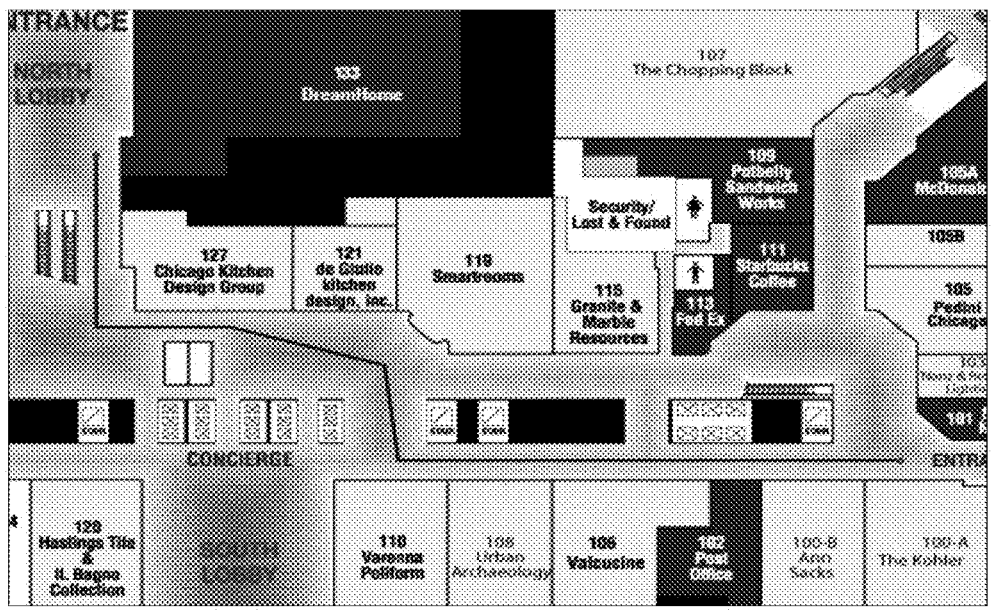
FIG. 7C depicts an example of post-processing the route of FIG. 7A using an algorithm described herein to provide a simplified route or open area map.

FIG. 7C depicts an example of post-processing the route of FIG. 7A using a curve evolution algorithm. As depicted in FIG. 7C, the updated path has eliminated all but four internal nodes between the starting and ending node. Also, the updated path does not travel as close to various non-traversable areas as the route in FIG. 7B created by a string-pulling algorithm.

As discussed above, the post-processing may be conducted using a curve evolution based path simplification algorithm. An overview or pseudocode of the curve evolution algorithm is described below:

```
PerformCurveEvolution(path)
{
    // If there are less than 3 nodes in the path, the algorithm is
      concluded.
    If number of nodes in path < 3, then
        return
            // Compute an initial score for each node in the path (score
              is stored in the node)
            For Each node in path
                ComputeScore(node)
            // Remove the node with the lowest score until no more
              nodes can be removed
            While (RemoveNode(path) == TRUE)
            return
}
```

Within the curve evolution algorithm, a value or weight is determined for each internal node. To compute a score for each specified node, the following pseudocode may be performed:

```
// Compute a score for the specified node
ComputeScore(currentNode)
{
    // If the current node is the first node in the path, only the outbound segment length is computed and
    // set the score to the maximum value
    If currentNode is first node Then
    {
        currentNode.outboundSegmentLength = distance between currentNode and nextNode
        currentNode.score = MAXIMUM_SCORE
        return
    }
    // If the current node is the last node in the path, the inbound segment length is set to the
    // previous node's outbound segment length and set the score to the maximum value
    If currentNode is last node Then
    {
        currentNode.inboundSegmentLength = previousNode.outboundSegmentLength
        currentNode.score = MAXIMUM_SCORE
        return
    }
    // Otherwise, compute the inbound and outbound segment lengths and the angle at the
    // current node
    currentNode.inboundSegmentLength = previousNode.outboundSegmentLength
    currentNode.outboundSegmentLength = distance between currentNode and nextNode
    currentNode.angle = angle between inboundSegment and outboundSegment
    // Cap the inbound and outbound segment lengths at 10 units
    cappedInboundLength = min(currentNode.inboundSegmentLength, 10)
    cappedOutboundLength = min(currentNode.outboundSegmentLength, 10)
    // Compute the current node's score
    currentNode.score = (currentNode.angle * cappedInboundLength * cappedOutboundLength)
                              / (cappedInboundLength + cappedOutboundLength)
    return
}
```

Within the curve evolution algorithm, the lowest score node is removed so long as the path remains valid. To remove the lowest score node, the following pseudocode may be performed:

```
// Remove the node with the minimum score (return FALSE if there are no
more nodes that can be removed,
// otherwise return TRUE)
RemoveNode(path)
{
    // Determine the node with the minimum score, ignoring nodes that have been marked as
    // unremoveable
    minScore = MAXIMUM_SCORE
    For Each node in path
    {
        If node.Removeable == TRUE and node.score < minScore Then
        {
            minScoreNode = node
            minScore = node.score
        }
    }
    // If a removable node was not found, the calculation is completed
    If minScoreNode doesn't exist
        return FALSE
    // Check to see if the node can be removed (make sure that removing the node will not cause
    // the path to intersect an unwalkable area based on the cost mesh)
    removeNode = Not LineHitsWall(prevNode, nextNode, costMesh)
    // If the minimum score node can be removed, remove it and re-compute the scores for the previous
    // and next nodes
    If removeNode Then
    {
        remove minScoreNode
        ComputeScore(prevNode)
        ComputeScore(nextNode)
        If number of nodes in path < 3 Then
            return FALSE
                Else
            return TRUE
    }
```

```
    // Set the current node to be unremoveable
    minScoreNode.removeable = FALSE
    return TRUE
}
```

Within the curve evolution algorithm, to determine if removal of the selected node would intersect a wall or non-traversable area, the following pseudocode may be performed:

```
// Check to see if the specified line segment intersects a wall based
// on the cost specified cost mesh
LineHitsWall(p0, p1, costMesh[ ][ ])
{
    // Rasterize the line segment to a series of points in the cost mesh
    pointsOnLine = rasterizeLine(p0, p1)
    // If the rasterized line intersects any unwalkable area on the cost
    mesh return TRUE,
    // otherwise return false
    For Each point in pointsOnLine
    {
        If point in costMesh is unwalkable Then
            return TRUE
    }
    return FALSE
}
```

Following execution of the curve evolution algorithm, the improved, simplified route or open area map may be provided to an end-user or map developer for implementation. For example, the simplified route may be provided for use in the map routing industry (e.g., for an improved indoor mapping route). In other embodiments, the simplified route may be used in the video game industry or the robotics industry.

Flowchart Embodiments

Figure 8:
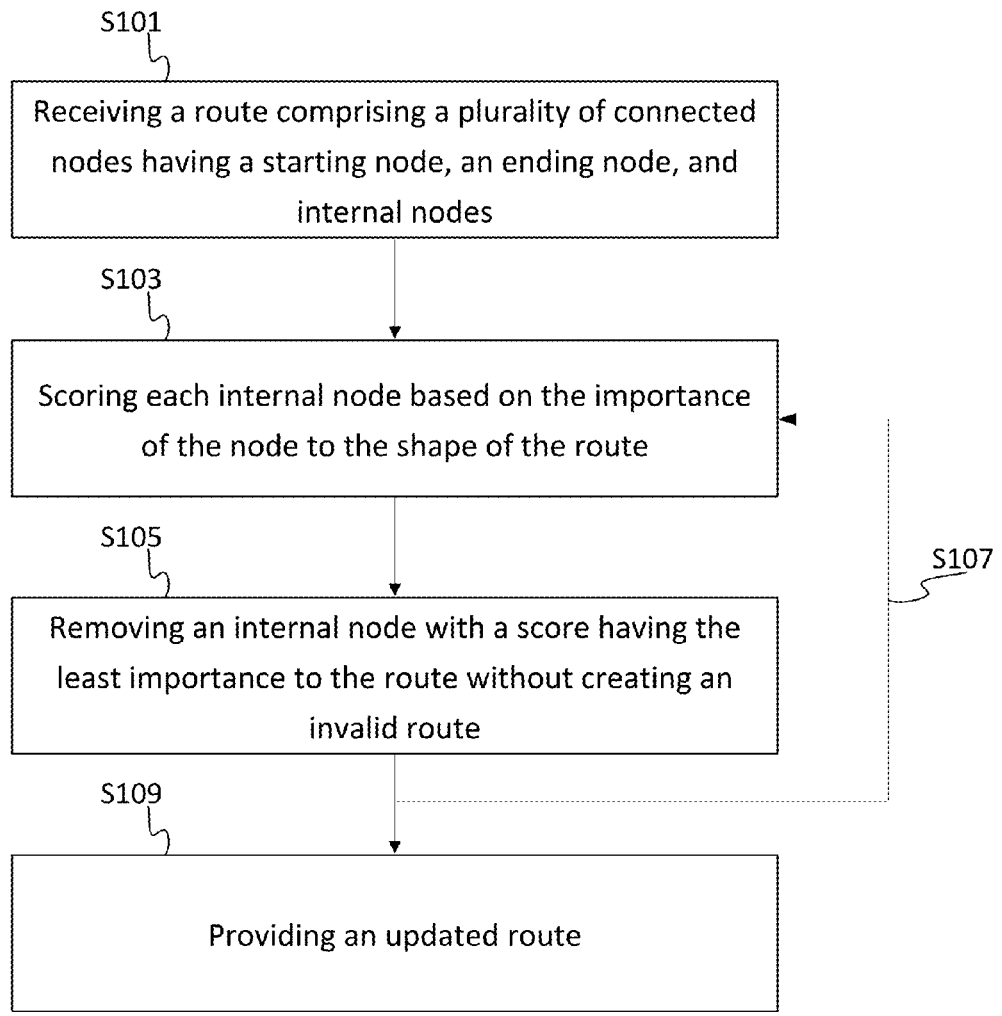
FIG. 8 illustrates an example flowchart for providing an improved route from a navigation mesh route.

FIG. 8 illustrates an example flowchart for determining an improved and simplified route. The process of the flowchart may be performed by the system or device described and depicted in FIG. 9. Alternatively, another device may be configured to perform one or more of the following acts. Additional, fewer, or different acts may be included.

At act S101, a route is received. The route includes a plurality of connected nodes comprising a starting node, an ending node, and internal nodes between the starting and ending nodes. The route may be a shortest-path route. The route may have been generated from a navigation mesh.

At act S103, a score is calculated for each internal node based on the importance of the node to the shape of the route. Factors that may impact the calculated score value for each node include the length of the incoming segment to the respective node, the length of the outgoing segment from the respective node, the path angle created by the incoming and outgoing segments, and/or the proximity of the node to a non-traversable object in the path route.

At act S105, an internal node is removed from the path route to simplify the route so long as the route remains valid. The node is chosen for removal based on having the least importance to the path route based on the calculated score value (as well as the node's lack of importance on maintaining a valid route).

Optionally, in act S107, the process of scoring the nodes and removing a node with a low score value in S103 and S105 may be repeated. The process may be repeated until no further internal nodes can be removed without creating an invalid path between the starting node and the ending node.

At act S109, the updated route is completed. The route may be provided to an end-user or map-developer for use in indoor mapping, robotics, or video gaming.

Processing and Network System

Figure 9:
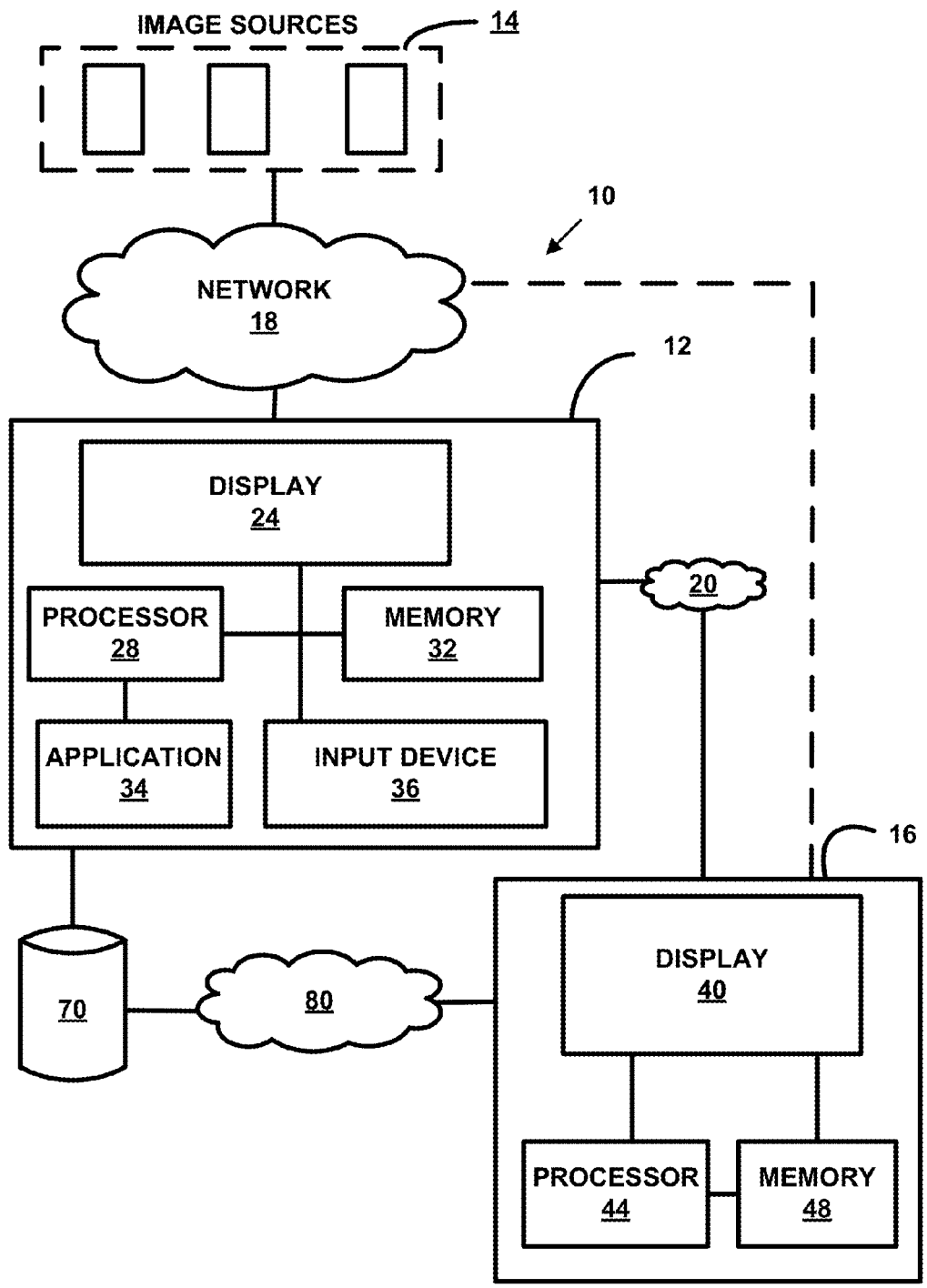
FIG. 9 depicts an example of a system for generating and processing a navigation mesh route.

FIG. 9 depicts one embodiment of a system 10 used for generating one or more navigation meshes. The system 10 includes, but is not limited to, an image source or sources 14, a network 18, a device 12, a network or connection 20, a database 70, a network 80, and a user device 16. Additional, fewer, or different components may be provided. For example, a proxy server, a name server, a map server, a cache server or cache network, a router, a switch or intelligent switch, a geographic database, additional computers or workstations, administrative components, such as an administrative workstation, a gateway device, a backbone, ports, network connections, and network interfaces may be provided. While the components in FIG. 9 are shown as separate from one another, one or more of these components may be combined.

The image source 14 is a website, an application, a program, a workstation or computer, a file, a memory, a server, a beacon or map beacon, a depository, and/or any other hardware and/or software component or database that can store or include images or data associated with images. Alternatively, the image source 14 is one or more images.

In one embodiment, the image source 14 includes one or more images of a layout. The images are raster or pixel based images, such as a JPEG, Bitmap, Pixmap, Tiff, or other pixel or raster based file format. The images may be raster or pixilated scanned copies of paper or hard layouts. Alternatively, the images may be vector based or vectorized images. Layouts may correspond to real-world areas in which a person, pedestrian, or people walk and/or move about. The layouts may also correspond to future real-world areas that have not been built yet. Alternatively, the layouts may correspond to imaginary locales, settings, or areas.

The layouts may represent an unorganized or unconstrained geographic area. For example, the layout is an area in which a pedestrian is not limited to travel only on a set road or path network. Rather, the pedestrian may walk through public plazas, parks, buildings, corridors, lobbies, or hallways having no associated road or path network or pattern. Additionally, the pedestrian does not have direction restrictions as a vehicle on a road. Moreover, the pedestrian has a greater degree of freedom of motion in the layout and may choose from a plethora of self-determined paths in any given open area.

The images of the layouts may include images of a real-world building floor plan, a parking lot, a park, an indoor or outdoor recreation area, and/or other interior and exterior area plans corresponding to places where a person can walk or move (e.g., via a wheel chair, a bicycle, or other mobile assistance device). The images are pre-existing or publicly available images. For example, the images are originally formed or created for purposes other than generating a routable map. The pre-existing images may be generated by an entity separate from a developer of a routable open area map and/or its end user. The pre-existing images are available to the public or an entity for free or for a purchase price (e.g., online). Alternatively, self-generated images, images originally generated for creating a routable map, or non-public images may be used.

The image source 14 is in communication with the device 12 via the network 18. The network is the Internet, an intranet, a local area network ("LAN"), a wide area network ("WAN"), a virtual private network ("VPN"), a local wireless or wired connection (e.g., a USB connection or other device connection), and/or any known or future network or connection.

The device 12 receives images of layouts from the image source 14 for generating routable open area maps. The device 12 is a workstation, computer, editing device, beacon or map beacon, and/or other computing or transmitting device. For example, the device 12 is an editing workstation. The device 12 includes, but is not limited to, a display 24, a processor 28, a memory 32, an application 34, and an input device 36. Additional, fewer, or different components may be provided. Audio components may be provided. For example, a speaker, audio jacks, and/or other components for outputting or receiving audible or sound signals are provided.

The display 24 is any mechanical and/or electronic display positioned for accessible viewing in, on, or in communication with the device 12. For example, the display 24 is a touch screen, liquid crystal display ("LCD"), cathode ray tube ("CRT") display, or a plasma display. The display 24 is operable to display images, such as images of layouts, floor plans, maps, or other areas. The input device 36 is a button, keypad, keyboard, mouse, trackball, rocker switch, touch pad, voice recognition circuit, or other device or component for controlling or inputting data in the device 12. The input device 36 may be used to perform functions, such as modifying received images (e.g., adding doors or openings) or using eraser tools.

The processor 28 is in communication with the memory 32, the application 34, the display 24, and the input device 36. The processor 28 may be in communication with more or fewer components. The processor 28 is a general processor, application-specific integrated circuit ("ASIC"), digital signal processor, field programmable gate array ("FPGA"), digital circuit, analog circuit, or combinations thereof. The processor 28 is one or more processors operable to control and/or communicate with the various electronics and logic of the device 12. The processor 28, the memory 32, and other circuitry may be part of an integrated circuit.

The memory 32 is any known or future storage device. The memory 32 is a non-volatile and/or volatile memory, such as a Random Access Memory "RAM" (electronic), a Read-Only Memory "ROM" (electronic), or an Erasable Programmable Read-Only Memory (EPROM or Flash memory). A memory network may be provided. The memory 32 may be part of the processor 28. The memory 32 is operable or configured to store images of layouts received by the image source 14. The memory 32 may also store images or data generated by the processor 28.

The processor 28 is operable or configured to execute the application 34. The application 34 is a software program used to generate open area maps that are routable based on pre-existing images, such as the images received from the image source 14. For example, the processor 28 runs the application 34 and creates or generates or assists in generation of a routable map via input from the input device 36 and/or automated commands. The application 34 may be stored in the memory 32 and/or other memory.

The device 12 is operable or configured to send or transmit one or more generated routable open area maps to the user device 16, or the user device 16 may request a routable open area map via a network or connection 20. The connection 20 is the Internet, an intranet, a local area network ("LAN"), a wide area network ("WAN"), a virtual private network ("VPN"), a local wireless or wired connection (e.g., a USB connection or other device connection), and/or any known or future network or connection.

Alternatively, the device 12 may store, upload, or send one or more generated routable open area maps or data thereof to the database 70. The database 70 may be a database, a memory, a website, a server, a beacon, or other device used for storing, receiving, and/or transmitting data corresponding to the routable open area maps. For example, the database 70 may store data entities that represent different layers of the open area map, such as data corresponding to reference regions, cost, restrictions, a grid or array, image data, and/or other content. The user device 16 may obtain a routable open area map or data thereof from the database 70 via the network 80, such as without communicating with the device 12. The network 80 is the Internet, an intranet, a local area network ("LAN"), a wide area network ("WAN"), a virtual private network ("VPN"), a local wireless or wired connection (e.g., a USB connection or other device connection), and/or any known or future network or connection.

Also, routable open area maps may be "pushed" onto the user device 16. For example, beacons, map beacons, or other devices can transmit or send routable open area maps or related content to the user device 16 based on the location or position of the user device 16. In one embodiment, a beacon can be placed at an entrance or passageway of a building or other area, and once the user device 16 comes within a certain range of the beacon, a routable open area map associated with the area and/or other related areas is sent to the user device 16.

The user device 16 is used to operate one or more routable maps to allow a user to navigate in or on respective layouts or areas. The user device 16 is a cellular telephone, a mobile phone, a personal digital assistant ("PDA"), a watch, a personal navigation device ("PND"), a computer, a digital floor plan device, a portable or non-portable navigation device, a kiosk, and/or other fixed, removable, or transportable digital device. The user device 16 includes, but is not limited to, a display 40, a processor 44, and a memory 48. Additional, fewer, or different components may be provided. For example, audio and/or application components may be provided. The display 40, the processor 44, and the memory 48 may be similar to or different than the display 24, the processor 28, and the memory 32, respectively.

In one embodiment, a user, such as a person working on a building floor, may want to be able to route or navigate about his or her building floor. Accordingly, an image of the layout or floor plan of the user's floor, which is stored in the image source 14, is transmitted and received at the device 12. Another entity, such as a map developer, operates the device 12. The map developer may be a person, company, or entity that develops maps for navigation or obtains and maintains map data and/or a geographic database. The map developer views the pre-existing image of the layout on the display 24 and generates a routable map based on the pre-existing image via the input device 36 and the software application 34. Automated commands and/or processes may be used in development of the routable open area map. Alternatively, the creation or generation of the routable open area map may be substantially entirely automated. The user may download or receive the routable map of his or her floor on the user device 16. For example, the user uses the user device 16 to download the routable map from the device 12 or a storage site or component associated with the device 12 (e.g., via the connection 20, such as a USB connection, a wireless connection, or other connection). Alternatively, the user may download the routable map on a device (e.g., a computer or a jump/thumb drive) different than the user device 16 and then transfer the data associated with the routable map to the user device 16 or other user device. The user then uses the device 16 to display the routable map for routing, guidance, and/or navigation purposes regarding the building floor.

In the above described embodiments, the communication network may include wired networks, wireless networks, or combinations thereof. The wireless network may be a cellular telephone network, an 802.11, 802.16, 802.20, or WiMax network. Further, the network may be a public network, such as the Internet, a private network, such as an intranet, or combinations thereof, and may utilize a variety of networking protocols now available or later developed including, but not limited to TCP/IP based networking protocols.

While the non-transitory computer-readable medium is described to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatuses can also be implemented as, special purpose logic circuitry, e.g., an FPGA (field programmable gate array) or an ASIC (application specific integrated circuit).

As used in this application, the term "circuitry" or "circuit" refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of "circuitry" applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Processors suitable for the execution of a computer program include, by way of example, both general and special purpose microprocessors, and any one or more processors of any kind of digital computer. Generally, a processor receives instructions and data from a read only memory or a random access memory or both. The essential elements of a computer are a processor for performing instructions and one or more memory devices for storing instructions and data. Generally, a computer also includes, or is operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., E PROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatuses and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

What is claimed is:

1. A method comprising:
    receiving a route comprising a plurality of connected nodes having a starting node, an ending node, and internal nodes;
    scoring, using a processor, each internal node of the plurality of connected nodes, wherein a score is provided for each internal node based on an importance of the respective internal node to a shape of the route;
    removing an internal node with a score having a least importance on the shape of the route while maintaining a valid route between the starting node and the ending node such that the valid route does not cross into a non-navigable area;
    repeating the scoring and the removing of the internal nodes, while maintaining the valid route, until no further internal nodes can be removed without creating an invalid route; and
    providing an updated route.

2. The method of claim 1, wherein the scoring of each internal node is based upon an incoming segment length from a first adjacent node to the respective internal node and an outgoing segment length from the respective internal node to a second, opposite adjacent node.

3. The method of claim 1, wherein a higher importance is provided for a larger incoming segment length over a smaller incoming segment length, and a larger outgoing segment length over a smaller outgoing segment length.

4. The method of claim 1, wherein the scoring of each internal node is based upon a path angle created between a first adjacent node, the respective internal node, and a second, opposite adjacent node.

5. The method of claim 4, wherein a higher importance is provided for a smaller path angle over a larger path angle.

6. The method of claim 1, wherein the scoring of each internal node is based upon a proximity of the respective node to a non-traversable object.

7. The method of claim 1, wherein the scoring of each internal node is based upon (1) an incoming segment length from a first adjacent node to the respective internal node and an outgoing segment length from the respective internal node to a second, opposite adjacent node, and (2) a path angle created between the first adjacent node, the respective internal node, and the second, opposite adjacent node.

8. The method of claim 7, wherein the scoring of each internal node is a weighted scoring based upon the incoming segment length, the outgoing segment length, and the path angle.

9. The method of claim 1, wherein the scoring of each internal node is a weighted scoring based on the following equation:

$$\text{Overall Node Value} = w1*f1 + w2*f2 + \ldots + wN*fN,$$

wherein:
f1, f2, ..., fN=scoring values for each individual factor for a total of N factors, and
w1, w2, ..., wN=respective weights for each individual factor, and
w1+w2+ ... +wN=1.

10. The method of claim 1, wherein the scoring of each internal node is based upon a curve evolution algorithm.

11. The method of claim 1, wherein the route is generated from a navigation mesh.

12. The method of claim 11, wherein the scoring of each internal node is a weighted scoring based on a resolution of the navigation mesh.

13. The method of claim 1, wherein the updated route is provided for use in an indoor map, video game, or robotic application.

14. A method comprising:
receiving a route generated from a navigation mesh, the route comprising a plurality of connected nodes having a starting node, an ending node, and internal nodes;
scoring, using a processor, each internal node of the plurality of connected nodes, wherein a score is determined for each internal node based on an importance of the respective internal node to a shape of the route, the score being based upon (1) an incoming segment length from a first adjacent node to the respective internal node and an outgoing segment length from the respective internal node to a second, opposite adjacent node, and (2) a path angle created between the first adjacent node, the respective internal node, and the second, opposite adjacent node;
removing an internal node with a score having a least importance on the shape of the route while maintaining a valid route between the starting node and the ending node such that the valid route does not cross into a non-navigable area;
repeating the scoring and the removing of the internal nodes, while maintaining the valid route, until no further internal nodes can be removed; and
providing an updated route without the removed internal nodes.

15. An apparatus comprising:
at least one processor; and
at least one memory including computer program code for one or more programs; the at least one memory and the computer program code configured to, with the at least one processor, cause the apparatus to at least perform:
receive a route comprising a plurality of connected nodes having a starting node, an ending node, and internal nodes;
score each internal node of the plurality of connected nodes, wherein a score is provided for each internal node based on an importance of the respective internal node to a shape of the route;
remove an internal node with a score having a least importance on the shape of the route while maintaining a valid route between the starting node and the ending node such that the valid route does not cross into a non-navigable area;
repeat the scoring and the removing of the internal nodes, while maintaining the valid route, until no further internal nodes can be removed without creating an invalid route; and
provide an updated route.

16. The apparatus of claim 15, wherein the scoring of each internal node is based upon an incoming segment length from a first adjacent node to the respective internal node and an outgoing segment length from the respective internal node to a second, opposite adjacent node, wherein a higher importance is provided for a larger incoming segment length over a smaller incoming segment length, and a larger outgoing segment length over a smaller outgoing segment length.

17. The apparatus of claim 15, wherein the scoring of each internal node is based upon a path angle created between a first adjacent node, the respective internal node, and a second, opposite adjacent node, wherein a higher importance is provided for a smaller path angle over a larger path angle.

* * * * *